(12) United States Patent
Zheng et al.

(10) Patent No.: US 12,156,061 B2
(45) Date of Patent: Nov. 26, 2024

(54) METHOD FOR CONTROLLING INTERFERENCE REPORTING, USER EQUIPMENT, AND NETWORK SIDE DEVICE

(71) Applicant: VIVO MOBILE COMMUNICATION CO., LTD., Guangdong (CN)

(72) Inventors: Qian Zheng, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 840 days.

(21) Appl. No.: 17/158,739

(22) Filed: Jan. 26, 2021

(65) Prior Publication Data

US 2021/0153057 A1    May 20, 2021

Related U.S. Application Data

(63) Continuation of application No. PCT/CN2019/096085, filed on Jul. 16, 2019.

(30) Foreign Application Priority Data

Jul. 27, 2018 (CN) .......................... 201810847184.3

(51) Int. Cl.
*H04W 24/10* (2009.01)
*H04B 17/345* (2015.01)

(52) U.S. Cl.
CPC .......... *H04W 24/10* (2013.01); *H04B 17/345* (2015.01)

(58) Field of Classification Search
None
See application file for complete search history.

(56) References Cited

U.S. PATENT DOCUMENTS

| | | | |
|---|---|---|---|
| 9,088,924 B2 * | 7/2015 | Fu | H04W 24/10 |
| 9,356,707 B2 * | 5/2016 | Fu | H04W 52/244 |
| 9,503,917 B2 * | 11/2016 | Lee | H04W 88/06 |
| 9,807,659 B2 * | 10/2017 | Fu | H04W 24/10 |
| 10,142,873 B2 * | 11/2018 | Van Lieshout | H04W 36/0005 |
| 10,708,801 B2 * | 7/2020 | Van Lieshout | H04W 8/24 |
| 10,911,972 B2 * | 2/2021 | Ahn | H04B 17/373 |
| 11,044,628 B2 * | 6/2021 | Van Lieshout | H04W 8/24 |

(Continued)

FOREIGN PATENT DOCUMENTS

| | | |
|---|---|---|
| CN | 102378192 A | 3/2012 |
| CN | 102595543 A | 7/2012 |

(Continued)

OTHER PUBLICATIONS

"Finalizing IDLE mode measurements for euCA", Nokia et al., 3GPP TSG-RAN WG2 Meeting #102, R2-1806772, dated May 25, 2018. (Year: 2018).*

(Continued)

*Primary Examiner* — Faiyazkhan Ghafoerkhan
(74) *Attorney, Agent, or Firm* — Harness, Dickey & Pierce, P.L.C.

(57) ABSTRACT

A method for controlling interference reporting includes: controlling an interference reporting behavior according to an interference reporting condition if radio interference is detected during a measurement performed in a non-connected state. The radio interference includes interference generated by in-device coexistence (IDC).

17 Claims, 4 Drawing Sheets

(56) References Cited

U.S. PATENT DOCUMENTS

| | | | | |
|---|---|---|---|---|
| 11,418,990 | B2* | 8/2022 | Ahn | H04J 3/00 |
| 2007/0165754 | A1* | 7/2007 | Kiukkonen | H04L 1/0015 |
| | | | | 375/346 |
| 2009/0010319 | A1* | 1/2009 | Sun | H04L 1/0029 |
| | | | | 455/67.11 |
| 2012/0026860 | A1* | 2/2012 | Yan | H04L 27/3854 |
| | | | | 370/215 |
| 2012/0040620 | A1* | 2/2012 | Fu | H04W 52/244 |
| | | | | 455/63.1 |
| 2012/0252442 | A1* | 10/2012 | Fu | H04W 24/10 |
| | | | | 455/426.1 |
| 2013/0094382 | A1* | 4/2013 | Ahn | H04B 7/26 |
| | | | | 370/252 |
| 2013/0114515 | A1* | 5/2013 | Koo | H04J 11/0023 |
| | | | | 370/328 |
| 2013/0114516 | A1* | 5/2013 | Koo | H04B 15/00 |
| | | | | 455/501 |
| 2013/0150106 | A1* | 6/2013 | Bucknell | H04W 4/70 |
| | | | | 455/501 |
| 2013/0288742 | A1* | 10/2013 | Yao | H04B 15/00 |
| | | | | 455/553.1 |
| 2013/0324172 | A1* | 12/2013 | Ahn | H04W 24/02 |
| | | | | 455/501 |
| 2014/0023032 | A1* | 1/2014 | Kim | H04W 72/542 |
| | | | | 370/329 |
| 2014/0141824 | A1* | 5/2014 | Kim | H04W 88/06 |
| | | | | 455/501 |
| 2014/0141825 | A1* | 5/2014 | Koo | H04W 48/08 |
| | | | | 455/501 |
| 2015/0105122 | A1* | 4/2015 | Wei | H04W 72/1215 |
| | | | | 455/553.1 |
| 2015/0131558 | A1* | 5/2015 | Van Lieshout | H04W 36/0005 |
| | | | | 370/329 |
| 2015/0271806 | A1* | 9/2015 | Kim | H04W 56/0005 |
| | | | | 455/552.1 |
| 2015/0334620 | A1* | 11/2015 | Fu | H04W 36/20 |
| | | | | 455/426.1 |
| 2016/0080964 | A1* | 3/2016 | Ahn | H04W 24/02 |
| | | | | 455/501 |
| 2017/0078908 | A1* | 3/2017 | Ahn | H04B 17/373 |
| 2018/0160420 | A1* | 6/2018 | Kim | H04L 5/0007 |
| 2018/0206142 | A1* | 7/2018 | Ahn | H04B 17/382 |
| 2019/0098526 | A1* | 3/2019 | Van Lieshout | H04W 8/24 |
| 2019/0200252 | A1* | 6/2019 | Ahn | H04B 17/345 |
| 2019/0342873 | A1* | 11/2019 | Kim | H04W 24/10 |
| 2020/0336930 | A1* | 10/2020 | Van Lieshout | H04W 36/00837 |
| 2021/0153057 | A1* | 5/2021 | Zheng | H04B 17/345 |
| 2021/0160723 | A1* | 5/2021 | Ahn | H04W 24/02 |
| 2022/0394537 | A1* | 12/2022 | Ahn | H04B 17/345 |

FOREIGN PATENT DOCUMENTS

| | | |
|---|---|---|
| CN | 102612039 A | 7/2012 |
| CN | 105338643 A | 2/2016 |
| CN | 105451347 A | 3/2016 |
| CN | 106162708 A | 11/2016 |
| JP | 2009521890 A | 6/2009 |
| JP | 2013123222 A | 6/2013 |
| WO | WO-2017030480 A1 | 2/2017 |

OTHER PUBLICATIONS

Supplementary European Search Report regarding Application No. 19840834.6-1212/3829209, PCT/CN2019/096085, dated Sep. 21, 2021.

"Finalizing IDLE mode measurements for euCA," Nokia et al., 3GPP TSG-RAN WG2 Meeting #102, R2-1806772, dated May 25, 2018.

"IDC impact for early measurement," Vivo, 3GPP TSG-RAN WG2 Meeting #106, R2-1905821, dated May 17, 2019.

"Measurement reporting in NB-IoT," Ericsson, 3GPP TSG-RAN2 Meeting #101bis, R2-1804963, dated Apr. 20, 2018.

"Summary of WI on Enhancing LTE CA utilization," Nokia, 3GPP TSG RAN Meeting #80, RP-181069, dated Jun. 14, 2018.

First Office Action regarding Japanese Patent Application No. 2021-505413, dated Feb. 10, 2022. Translation provided by Bohui Intellectual Property.

International Search Report and Written Opinion of the International Searching Authority regarding International Application No. PCT/CN2019/096085, dated Oct. 15, 2019. Translation provided by Bohui Intellectual Property.

3GPP TSG-RAN WG2 Meeting #79, R2-123359, "IDC Considerations for MDT," Nokia Siemens Networks, Aug. 17, 2012.

3GPP TSG-RAN WG2 Meeting #91, R2-153849, "Enhanced coverage optimization use case analysis," Nokia Networks, Aug. 28, 2015.

First Office Action regarding Chinese Patent Application No. 201810847184.3, dated Jun. 2, 2020. Translation provided by Bohui Intellectual Property.

Extended European Search Report regarding European Patent Application No. 23194516.3, dated Dec. 14, 2023.

First Office Action regarding European Patent Application No. 23194516.3, dated Jan. 3, 2024.

Second Office Action regarding Chinese Patent Application No. 201810847184.3, dated Feb. 20, 2021. Translation provided by Bohui Intellectual Property.

Second Office Action regarding Japanese Patent Application No. 2021-505413, dated Jun. 14, 2022. Translation provided by Bohui Intellectual Property.

Zte, "Discussion on the DRX Based Solution for IDC", Document R2-115768, 3GPP TSG-RAN WG2 Meeting #76, Nov. 14-18, 2011.

* cited by examiner

METHOD FOR CONTROLLING INTERFERENCE REPORTING, USER EQUIPMENT, AND NETWORK SIDE DEVICE

CROSS-REFERENCE TO RELATED APPLICATIONS

This application is a Bypass Continuation Application of PCT/CN2019/096085 filed on Jul. 16, 2019, which claims priority to Chinese Patent Application No. 201810847184.3, filed on Jul. 27, 2018, which are incorporated herein by reference in their entirety.

TECHNICAL FIELD

The present disclosure relates to the field of communications technologies, and more particularly, to a method for controlling interference reporting, a user equipment (UE), and a network side device.

BACKGROUND

An enhanced utilization of carrier aggregation (EuCA) technology is introduced into a Long Term Evolution (LTE) system, which can realize rapid activation and deactivation of carriers.

When the UE is in the non-connected state, since there is no radio resource control (RRC) connection between the UE and a network side device, a solution to the problem of in-device coexistence (IDC) in the related art cannot be reused for the non-connected state measurement.

SUMMARY

Some embodiments of the present disclosure provide a method for controlling interference reporting, a UE and a network side device, so as to solve the IDC problem in the non-connected state.

In order to solve the above technical problem, the present disclosure is implemented as follows.

In a first aspect, some embodiments of the present disclosure provide a method for controlling interference reporting, which is performed by a UE. The method includes:

controlling an interference reporting behavior according to an interference reporting condition if radio interference is detected during a measurement performed in a non-connected state.

The radio interference includes interference generated by IDC.

In a second aspect, some embodiments of the present disclosure provide a method for controlling interference reporting, which is performed by a network side device. The method includes:

sending interference reporting configuration information to a UE so that the UE controls an interference reporting behavior in a non-connected state according to the interference reporting configuration information.

Radio interference of the UE in the non-connected state includes interference generated by IDC.

In a third aspect, some embodiments of the present disclosure provide a UE, and the UE includes:

a processor being configured to control an interference reporting behavior according to an interference reporting condition if radio interference is detected during a measurement performed in a non-connected state.

The radio interference includes interference generated by IDC.

In a fourth aspect, some embodiments of the present disclosure provide a network side device, and the network side device includes a memory, a processor and a computer program stored in the memory and executable on the processor. The computer program, when executed by the processor, implements steps in the method for controlling interference reporting corresponding to the network side device provided in some embodiments of the present disclosure.

In a fifth aspect, some embodiments of the present disclosure provide a non-transitory computer-readable storage medium. The non-transitory computer-readable storage medium has stored thereon a computer program that, when executed by a processor, implements steps in the method for controlling interference reporting corresponding to the UE provided in some embodiments of the present disclosure, or implements steps in the method for controlling interference reporting corresponding to the network side device provided in some embodiments of the present disclosure.

BRIEF DESCRIPTION OF THE DRAWINGS

In order to describe technical solutions in some embodiments of the present disclosure more clearly, the accompanying drawings to be used in the description of some embodiments of the present disclosure will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in some embodiments of the present disclosure will be described clearly and completely below with reference to accompanying drawings in some embodiments of the present disclosure. Obviously, the described embodiments are merely some but not all embodiments of the present disclosure. All other embodiments obtained on the basis of the embodiments of the present disclosure by a person of ordinary skill in the art without paying any creative effort shall be included in the protection scope of the present disclosure.

The terms "include", "comprise" or any other variants thereof in the description and claims of this application are intended to indicate a non-exclusive inclusion. For example, a process, a method, a system, an article, or a device that includes a series of steps or elements is not necessarily limited to those steps or elements explicitly listed, but may include other steps or elements not expressly listed or inherent to the process, the method, the article or the device. In addition, "and/or" is used in the description and claims to refer to at least one of the connected objects. For example, the phrase "A and/or B" includes three situations: A alone, B alone, and both A and B.

In some embodiments of the present disclosure, the words such as "for example" or "such as" are used to indicate examples, illustrations or explanations. Any embodiment or design solution described as "for example" or "such as" in some embodiments of the present disclosure should not be construed as being more preferable or advantageous than other embodiments or design solutions. To be precise, use of the words such as "for example" or "such as" is intended to present related concepts in a specific manner.

Embodiments of the present disclosure are described below with reference to the drawings. The method for controlling interference reporting, the UE and the network side device provided by some embodiments of the present disclosure may be applied to a wireless communication system. The wireless communication system may be a 5G system, an evolved long term evolution (eLTE) system, or a subsequent evolution communication system.

Figure 1:
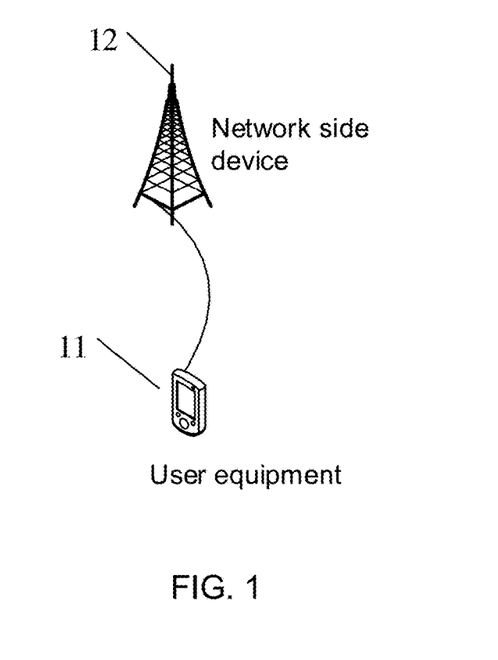
FIG. 1 is a structural diagram of an interference reporting control system, in accordance with some embodiments of the present disclosure.

FIG. 1 is a structural diagram of an interference reporting control system, in accordance with some embodiments of the present disclosure. As shown in FIG. 1, the system includes a user equipment (UE) 11 and a network side device 12. The UE 11 may be a mobile communication device such as a phone, a tablet personal computer, a laptop computer, a personal digital assistant (PDA), a mobile internet device (MID) or a wearable device. It will be noted that a specific type of the UE 11 is not limited in some embodiments of the present disclosure. The network side device 12 may be a 5G network side device (e.g., a gNB, a 5G NR NB), a fourth-Generation (4G) network side device (e.g., an eNB), a third-Generation (3G) network side device (e.g., an NB), or a network side device of the subsequent evolution communication system. It will be noted that a specific type of the network side device 12 is not limited in some embodiments of the present disclosure.

In a 5G NR system, in addition to a connected state and an idle state, an independent RRC state is also introduced, which is referred to as an inactive state. Herein, the idle stale and the inactive state may be referred to as non-connected states. Therefore, some embodiments of the present disclosure may be applicable to the UE in the idle state or inactive state in the eLTE system or the 5G NR system.

Currently, an LTE EuCA project aims to enhance a carrier aggregation technology, and has introduced a rapid activation and deactivation function. The rapid activation and deactivation may refer to rapid activation and deactivation of carriers suitable for the eLTE system. It may also refer to rapid activation and deactivation of carriers suitable for the 5G NR system, rapid activation and deactivation of a bandwidth part (BWP) suitable for the 5G NR system, and so forth.

In the technology of rapid activation and deactivation of carriers, one possible method is: the UE performs measurement in the non-connected state, and when the UE determines that there is a measurement result in the non-connected state, and the network side device expects to receive the measurement result obtained by the UE in the non-connected state, or the network side device requires the UE to report the measurement result, the UE reports the measurement result obtained in the non-connected state to the network side device, or reports that the measurement result obtained in the non-connected state is available. In this way, the network side device may be able to rapidly configure and activate the carriers of the UE according to the measurement result reported by the UE.

Depending on different network and service requirements, a same UE may be equipped with a variety of different wireless transceivers, such as LTE, fifth-Generation (5G), Wi-Fi, Bluetooth, and global navigation satellite system (GNSS). In the adjacent frequency or harmonic frequency portion, the receiver in the UE may be subject to radio interference from the transmitter in the UE, and thus the UE may have the problem of IDC.

The EuCA technology requires that the UE perform measurements in a non-connected state (e.g., idle state). If other wireless transceivers (e.g., Wi-Fi) are turned on at a same time when the UE performs measurements in the non-connected state, the problem of IDC may occur, resulting in inaccurate measurement of the UE in the non-connected state.

When the UE performs measurements in the non-connected state, there may also be an IDC problem, which may cause the UE to measure LTE CA frequency points inaccurately. Therefore, when the UE detects the IDC problem during a measurement performed in a non-connected state, the UE needs to record the IDC problem in some way and report the IDC problem to the network side device. Since the UE is not in RRC connection with the network side device in the non-connected state, signaling flows in the related art cannot be used to solve the IDC problem present in measurements by the UE in the non-connected state.

Based on this, some embodiments of the present disclosure aim to propose a solution and related signaling flows for solving the problem of IDC present in measurements in the non-connected state.

To achieve the above purpose, some embodiments of the present disclosure provide an interference reporting control system as shown in FIG. 1, and provide a method for controlling interference reporting that is applied to the interference reporting control system. The method is as follows:

controlling an interference reporting behavior according to an interference reporting condition if the UE detects radio interference during a measurement performed by the UE in a non-connected state. The radio interference includes interference generated by IDC.

In some embodiments of the present disclosure, if the UE detects the radio interference generated by IDC during measurements performed in the non-connected state, the UE may control the interference reporting behavior according to the interference reporting condition. As such, it may be possible to solve the problem of IDC present in measurements performed in the non-connected state, and improve support for the technical solution of enhanced carrier rapid activation and deactivation. In this way, the network side device may be able to send configuration information for eliminating the radio interference according to the interference information reported by the UE, and the communication performance may be improved.

Figure 2:
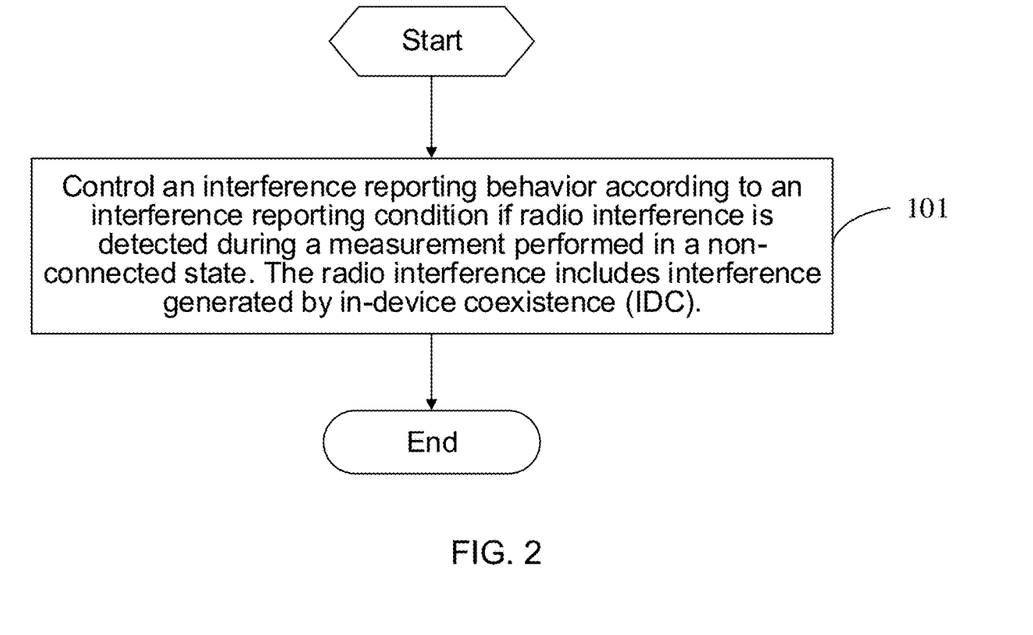
FIG. 2 is a flow diagram of a method for controlling interference reporting, in accordance with some embodiments of the present disclosure.

FIG. 2 is a flow diagram of a method for controlling interference reporting, in accordance with some embodiments of the present disclosure. As shown in FIG. 2, some embodiments of the present disclosure provide a method for controlling interference reporting, the method is performed by a UE and the method includes the following step:

step 101, controlling an interference reporting behavior according to an interference reporting condition if radio interference is detected during a measurement performed in a non-connected state. The radio interference includes interference generated by IDC.

In some embodiments of the present disclosure, the UE may start the measurement in the non-connected state based on measurement configuration information sent by the network side device, and the UE may also start the measurement in the non-connected state by itself based on its own CA capability in non-connected state measurement.

The measurement configuration information may include any combination of one or more of:

measurement duration;

measurement frequency points;

measurement bandwidth or bandwidth part (BWP);

measurement valid area, e.g., a cell identity (ID) list, a physical cell identity (PCI) list, a subset or whole set of a ran notification area (RNA) ID list, and a subset or whole set of a core network tracking area (TA) ID list;

measurement target area, e.g., the cell ID list, the PCI list, the subset or whole set of the RNA ID list, and the subset or whole set of the TA ID list;

measurement type, e.g., any one or any combination of reference signal received power (RSRP), reference signal received quality (RSRQ), and signal to interference plus noise ratio (SINR);

measurement reporting threshold, e.g., based on any one or any combination of RSRP threshold, RSRQ threshold, and SINR threshold.

In some embodiments of the present disclosure, if the UE detects the radio interference generated by IDC during measurements performed in the non-connected state, the UE may control the interference reporting behavior according to the interference reporting condition. As such, it may be possible to solve the problem of IDC present in measurements performed in the non-connected state, and improve support for the technical solution of enhanced carrier rapid activation and deactivation. In this way, the network side device may send the configuration information for eliminating the radio interference according to the interference information reported by the UE, thereby improving the communication performance.

In some embodiments of the present disclosure, the non-connected state may be an idle state or an inactive state. That is to say, the method for controlling interference reporting provided in some embodiments of the present disclosure may be applied to both the UE in the idle state and the UE in the inactive state. Thus, the method for controlling interference reporting provided in some embodiments of the present disclosure may be applied to both the eLTE system and the 5G NR system.

In some embodiments of the present disclosure, it can be determined to report the interference information according to the interference reporting condition, and it may also be determined not to report the interference information according to the interference reporting condition. In a case where it is determined to report the interference information according to the interference reporting condition, the step of controlling the interference reporting behavior according to the interference reporting condition includes:

reporting the interference information to the network side device during transition of the UE from a non-connected state to a connected state or when the UE is in the connected state.

It can be understood that, a timing for the UE to report the interference information to the network side device may be when the UE transitions from the non-connected state to the connected state, or when the UE enters the connected state.

In some embodiments, the step of reporting the interference information to the network side device during transition of the UE from the non-connected state to the connected state or when the UE is in the connected state includes:

reporting the interference information to the network side device through a third message (Msg3) or a fifth message (Msg5) in a process of initiating RRC connection establishment or resuming RRC connection by the UE; or reporting the interference information to the network side device through a dedicated signaling of the connected state in a case where the UE is in the connected state.

The Msg3 may be at least one of an RRC setup request message, an RRC resume request message; and the Msg5 may be at least one of an RRC setup complete message, an RRC resume complete message.

The dedicated signaling of the connected state may be at least one of a UE information response message, a UE assistance information message.

In some embodiments of the present disclosure, the interference information reported by the UE to the network side device includes any combination of one or more of:

interference indication information, affected measurement frequency domain, affected measurement area, affected measurement type, affected measurement time domain, affected radio access technology (RAT), or affected system type.

The interference indication information is used to indicate whether the UE detects the IDC problem. For example, it may be indicated as true/false through 1 bit.

The affected measurement frequency domain may include at least one of affected frequency points, affected bandwidth, affected BWP. Affected frequency points may be frequency points measured based on the CA capability of the UE, or may be measurement frequency points included in the measurement configuration information.

The affected measurement area may be the measurement target area included in the measurement configuration information, and the affected measurement type may be the measurement type included in the measurement configuration information.

The affected measurement time domain may be understood as affected time information, such as subframe pattern or slot pattern.

The affected RAT may be radio technologies such as evolved universal terrestrial radio access (E-UTRA), new radio (NR), industrial scientific medical (ISM), and GNSS.

The affected system type may be global positioning system (GPS), GNSS, Beidou system (BDS), Galileo satellite navigation system (Galileo), wireless local area network (WLAN), Bluetooth, etc.

In some embodiments of the present disclosure, the interference reporting condition may be pre-agreed by a protocol, or may be obtained through interference reporting configuration information sent by the network side device, or may be negotiated and agreed between the UE and the network side device. These three different cases will be specifically described below.

In a case where the interference reporting condition is pre-agreed by the protocol, any one of the following interference reporting conditions may be agreed by the protocol: if the radio interference is detected during the measurement performed in the non-connected state, the UE always reports interference information to the network side device; or, depending on whether the UE has an interference detection assistance capability, and the UE reports the interference information to the network side device in a case where it has the interference detection assistance capability. In this case, the UE may report the problem of IDC autonomously.

In a case where the interference reporting condition is obtained through the interference reporting configuration information sent by the network side device, the interference reporting configuration information includes at least one of:

information for instructing the UE whether to report interference; or interference reporting threshold information for instructing the UE to report the interference.

If the network side device allows the UE to report the IDC problem, then the interference reporting configuration information includes information for instructing the UE to report the interference; if the network side device does not allow the UE to report the IDC problem, the interference reporting configuration information includes information for instructing the UE not to report the interference.

The interference reporting threshold information may include at least one of an interference reporting threshold, an interference reporting offset threshold. The interference reporting offset threshold refers to an offset threshold for a reference value, and the reference value may be defined as a measurement reporting threshold in the measurement configuration information.

In some embodiments, in a case where the UE starts the measurement in the non-connected state based on the measurement configuration information sent by the network side device, the interference reporting configuration information may be sent through an RRC message carrying the measurement configuration information. That is, the interference reporting configuration information and the measurement configuration information may be included in a same RRC message and sent together. The interference reporting configuration information and the measurement configuration information may also be sent through different RRC messages.

In some embodiments, in a case where the interference reporting condition is obtained through interference reporting configuration information sent by the network side device, and the interference reporting configuration information includes the interference reporting threshold and/or the interference reporting offset threshold, the step of controlling the interference reporting behavior according to the interference reporting condition includes:

reporting the interference information to the network side device if at least one of following conditions is met:

a measurement result of the UE in the non-connected state is less than or equal to the interference reporting threshold; or an offset between the measurement result of the UE in the non-connected state and a measurement reporting threshold is greater than or equal to the interference reporting offset threshold.

In addition, given that the UE may temporarily change its interference reporting capability, in a case where the UE changes the interference reporting capability, the network side device needs to reconfigure the interference reporting configuration information. Therefore, the interference reporting condition may be negotiated and agreed between the UE and the network side device.

In some embodiments of the present disclosure, if the UE detects the IDC problem during the measurement in the non-connected state, at least one of a measurement behavior, a measurement result may be processed accordingly.

If the UE detects the IDC problem during the measurement in the non-connected state, the measurement behavior may be processed in any of the following ways:

stopping the measurement behavior in the non-connected state;

suspending the measurement behavior in the non-connected state; or continuing the measurement behavior in the non-connected state.

Herein, in specifically which way the UE processes the measurement behavior may be determined according to an influence of the IDC problem on the measurement result. If the IDC problem has a sufficiently large impact on the measurement result, which may invalidate the measurement behavior in the non-connected state, the UE may stop or suspend the measurement behavior in the non-connected state. If the impact of the IDC problem on the measurement result is within an acceptable range, the UE may continue the measurement behavior in the non-connected state.

If the UE detects the IDC problem during the measurement performed in the non-connected state, and in a case where the measurement result in the non-connected state meets a preset condition, the measurement result is reported to the network side device, or it is reported to the network side device that there is an available measurement result.

The preset condition includes at least one of:

the measurement result is greater than or equal to a measurement reporting threshold;

the measurement result is greater than or equal to the interference reporting threshold; or an offset between the measurement result and the measurement reporting threshold is less than or equal to the interference reporting offset threshold.

It will be noted that, in a case where the measurement result does not meet any of the above conditions, the UE may also report the measurement result to the network side device, so that the network side device can perform auxiliary diagnosis of the IDC problem according to the measurement result. This is beneficial for the network side device to send configuration information for eliminating the radio interference, thereby improving the communication performance.

Figure 3:
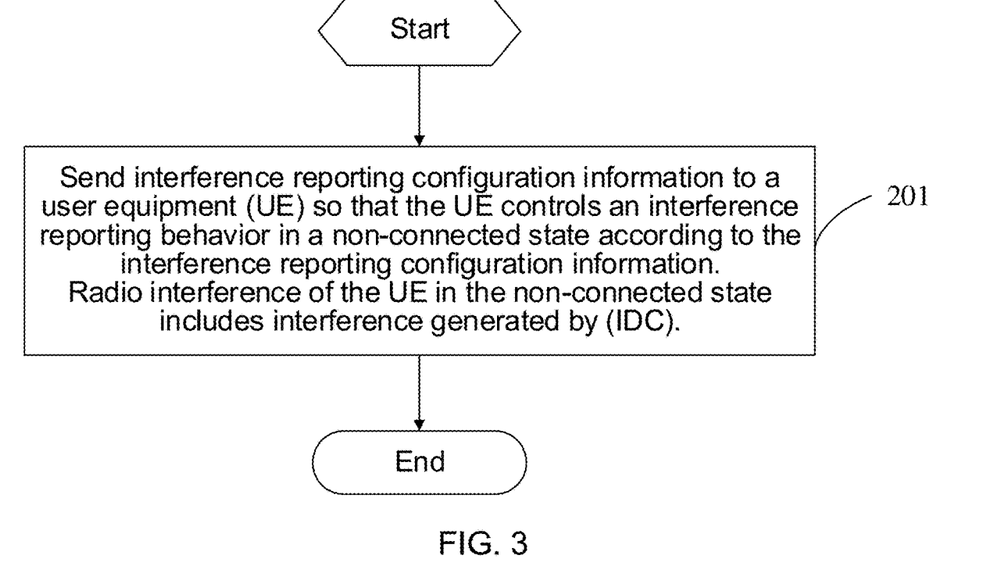
FIG. 3 is a flow diagram of another method for controlling interference reporting, in accordance with some embodiments of the present disclosure.

FIG. 3 is a flow diagram of another method for controlling interference reporting, in accordance with some embodiments of the present disclosure. As shown in FIG. 3, some embodiments of the present disclosure provide a method for controlling interference reporting, the method is performed by a network side device and the method includes the following step:

step 201, sending interference reporting configuration information to a UE so that the UE controls an interference reporting behavior in a non-connected state according to the interference reporting configuration information.

The radio interference of the UE in the non-connected state includes interference generated by IDC.

Optionally, the interference reporting configuration information includes at least one of:

information for instructing the UE whether to report interference; or interference reporting threshold information for instructing the UE to report the interference.

Optionally, the interference reporting threshold information includes an interference reporting threshold and/or an interference reporting offset threshold.

Optionally, the interference reporting configuration information is sent through an RRC message carrying measurement configuration information; or the interference reporting configuration information and the measurement configuration information are sent through different RRC messages.

It will be noted that, as for specific implementation manners of some embodiments of the present disclosure, which are embodiments of a network side device corresponding to the embodiment shown in FIG. 2, reference may be made to relevant descriptions of the embodiment shown in FIG. 2, and the same beneficial effects may be achieved. In order to avoid repetition, details will not be repeated here.

Figure 4:
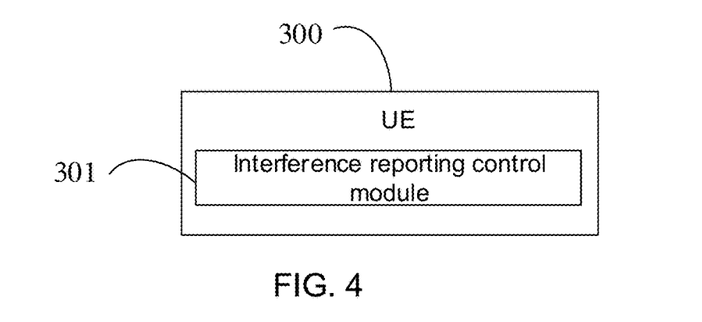
FIG. 4 is a structural diagram of a UE, in accordance with some embodiments of the present disclosure.

FIG. 4 is a structural diagram of a UE, in accordance with some embodiments of the present disclosure. As shown in FIG. 4, the UE 300 includes:

an interference reporting control module 301 for controlling an interference reporting behavior according to an interference reporting condition if radio interference is detected during a measurement performed in a non-connected state.

The radio interference includes interference generated by IDC.

Optionally, the interference reporting condition is pre-agreed by a protocol; or the interference reporting condition is obtained through interference reporting configuration information sent by a network side device; or the interference reporting condition is negotiated and agreed between the UE and the network side device.

Optionally, in a case where the interference reporting condition is pre-agreed by the protocol, the interference reporting condition includes:

always reporting interference information to the network side device; or reporting the interference information to the network side device in a case where the UE has an interference detection assistance capability.

Optionally, the interference reporting control module 301 is specifically used for:

reporting the interference information to the network side device during transition of the UE from the non-connected state to a connected state or when the UE is in the connected state.

Optionally, the interference reporting control module 301 is specifically used for:

reporting the interference information to the network side device through a Msg3 or a Msg5 in a process of initiating RRC connection establishment or resuming RRC connection by the UE; or reporting the interference information to the network side device through a dedicated signaling of the connected state in a case where the UE is in the connected state.

Optionally, the interference information includes at least one of:

interference indication information, affected measurement frequency domain, affected measurement area, affected measurement type, affected measurement time domain, affected RAT, or affected system type.

Optionally, the interference reporting configuration information includes at least one of:

information for instructing the UE whether to report interference; or interference reporting threshold information for instructing the UE to report the interference.

Optionally, the interference reporting threshold information includes an interference reporting threshold and/or an interference reporting offset threshold.

Optionally, the interference reporting control module 301 is specifically used for:

reporting the interference information to the network side device if at least one of following items is met:

a measurement result of the UE in the non-connected state is less than or equal to the interference reporting threshold; or an offset between the measurement result of the UE in the non-connected state and the measurement reporting threshold is greater than or equal to the interference reporting offset threshold.

Optionally, the interference reporting configuration information is sent through an RRC message carrying measurement configuration information; or the interference reporting configuration information and the measurement configuration information are sent through different RRC messages.

Figure 5:
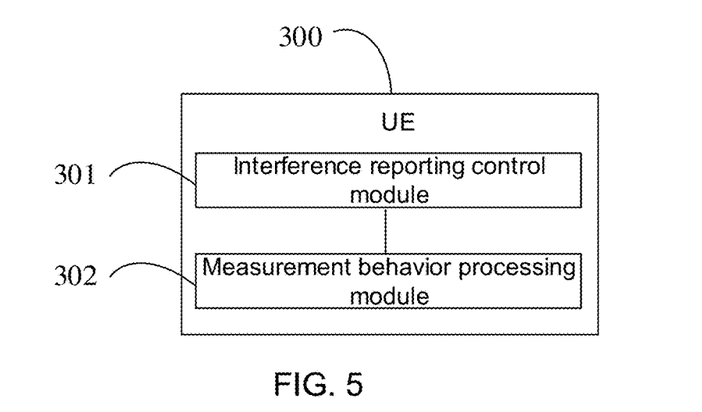
FIG. 5 is a structural diagram of another UE, in accordance with some embodiments of the present disclosure.

Optionally, as shown in FIG. 5, the UE 300 further includes a measurement behavior processing module 302 used for:

if the radio interference is detected during the measurement performed in the non-connected state, stopping a measurement behavior in the non-connected state, suspending the measurement behavior in the non-connected state, or continuing the measurement behavior in the non-connected state.

Figure 6:
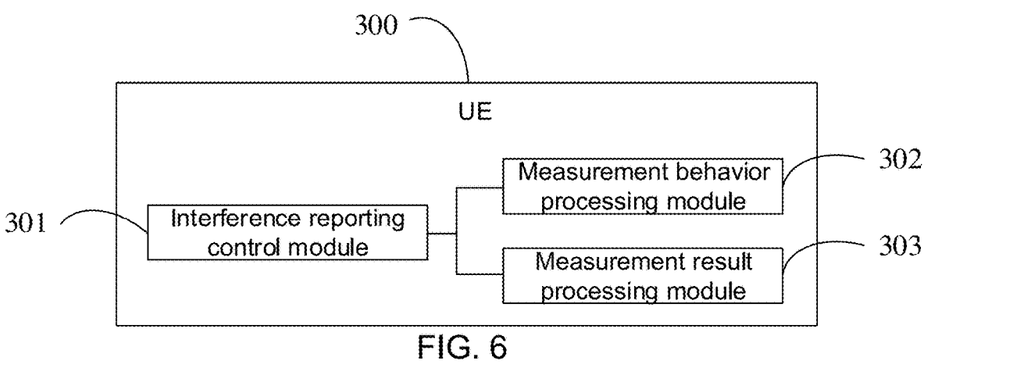
FIG. 6 is a structural diagram of yet another UE, in accordance with some embodiments of the present disclosure.

Optionally, as shown in FIG. 6, the UE 300 further includes a measurement result processing module 303 used for:

if the radio interference is detected during the measurement performed in the non-connected state and in a case where the measurement result in the non-connected state meets a preset condition, reporting a measurement result in the non-connected state to the network side device, or reporting to the network side device that there is an available measurement result.

The preset condition includes at least one of:

the measurement result in the non-connected state is greater than or equal to a measurement reporting threshold;

the measurement result in the non-connected state is greater than or equal to the interference reporting threshold; or an offset between the measurement result in the non-connected state and the measurement reporting threshold is less than or equal to the interference reporting offset threshold.

Optionally, the non-connected state includes an idle state or an inactive state.

It will be noted that, in some embodiments of the present disclosure, the UE 300 may be a UE in any implementation manner in the method embodiments. Any implementation manner of the UE in the method embodiments may be implemented by the UE 300 provided in some embodiments of the present disclosure, and the same beneficial effects may be achieved. In order to avoid repetition, details will not be repeated here.

Figure 7:
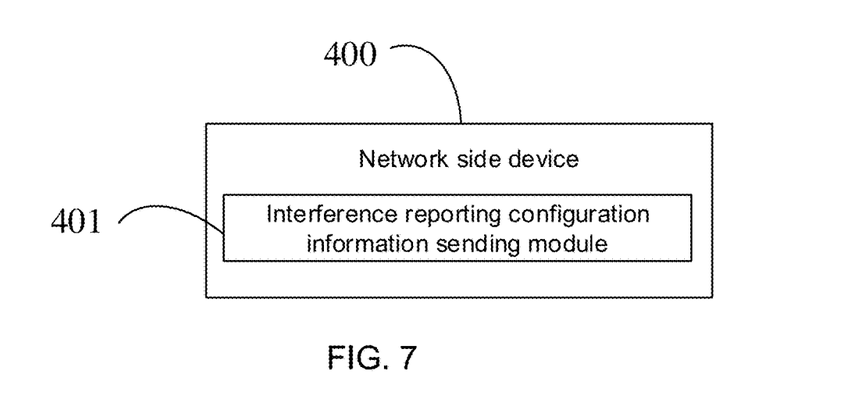
FIG. 7 is a structural diagram of a network side device, in accordance with some embodiments of the present disclosure.

FIG. 7 is a structural diagram of a network side device, in accordance with some embodiments of the present disclosure. As shown in FIG. 7, the network side device 400 includes:

an interference reporting configuration information sending module 401 for sending interference reporting configuration information to a UE so that the UE controls an interference reporting behavior in a non-connected state according to the interference reporting configuration information.

Radio interference of the UE in the non-connected state includes interference generated by IDC.

Optionally, the interference reporting configuration information includes at least one of:

information for instructing the UE whether to report interference; or interference reporting threshold information for instructing the UE to report the interference.

Optionally, the interference reporting threshold information includes an interference reporting threshold and/or an interference reporting offset threshold.

Optionally, the interference reporting configuration information is sent through an RRC message carrying measurement configuration information; or the interference reporting configuration information and the measurement configuration information are sent through different RRC messages.

It will be noted that, in some embodiments of the present disclosure, the network side device 400 may be a network side device in any implementation manner in the method embodiments. Any implementation manner of the network side device in the method embodiments may be implemented by the network side device 400 provided in some embodiments of the present disclosure, and the same beneficial effects may be achieved. In order to avoid repetition, details will not be repeated here.

Figure 8:
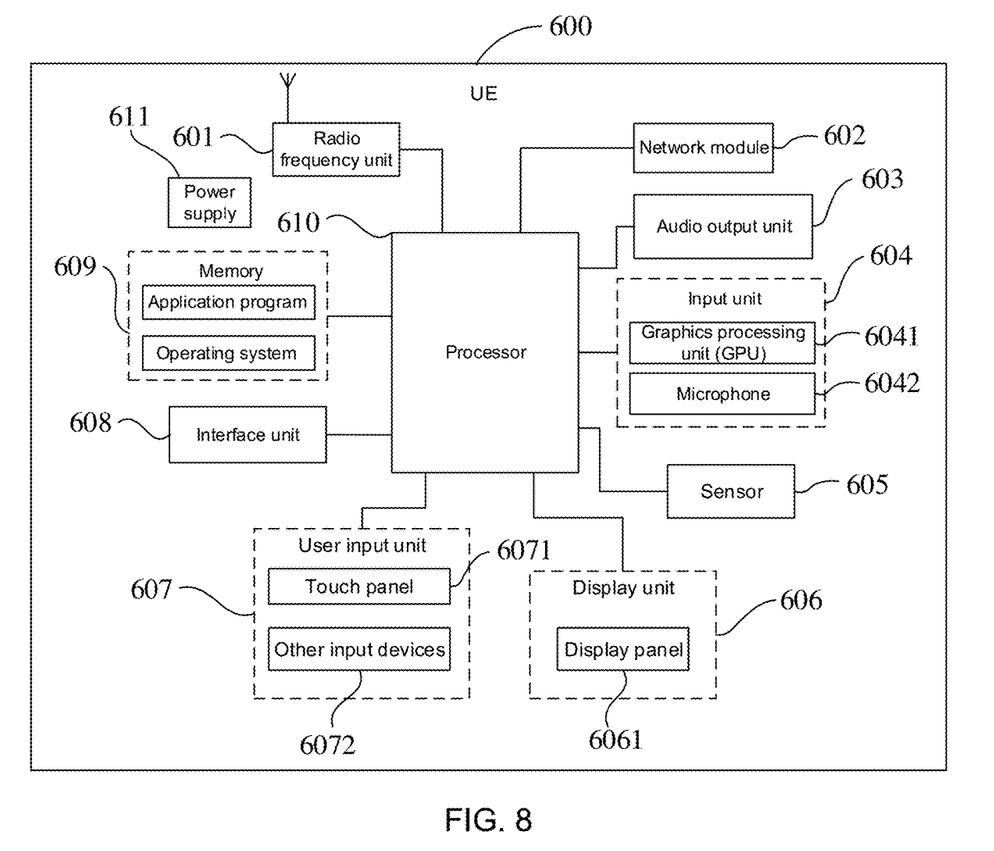
FIG. 8 is a schematic diagram showing a hardware structure of a UE, in accordance with some embodiments of the present disclosure.

FIG. 8 is a schematic diagram showing a hardware structure of a UE that implements all embodiments of the present disclosure. The UE 600 includes, but is not limited to, components such as a radio frequency unit 601, a network module 602, an audio output unit 603, an input unit 604, a sensor 605, a display unit 606, a user input unit 607, an interface unit 608, a memory 609, a processor 610 and a power supply 611. A person skilled in the art will understand that a structure of the UE shown in FIG. 8 does not constitute a limitation on the UE, and that the UE may include more or fewer components than the UE shown, or may combine certain components, or may have a different arrangement of components. In some embodiments of the present disclosure, the UE includes, but is not limited to, a mobile phone, a tablet computer, a notebook computer, a palmtop computer, a vehicle-mounted device, a wearable device or a pedometer.

The processor 610 is configured to:

control an interference reporting behavior according to an interference reporting condition if radio interference is detected during a measurement performed in the non-connected state.

The radio interference includes interference generated by IDC.

Optionally, the interference reporting condition is pre-agreed by a protocol; or the interference reporting condition is obtained through interference reporting configuration information sent by a network side device; or the interference reporting condition is negotiated and agreed between the UE and the network side device.

Optionally, in a case where the interference reporting condition is pre-agreed by the protocol, the interference reporting condition includes:

always reporting interference information to the network side device; or reporting the interference information to the network side device in a case where the UE has an interference detection assistance capability.

Optionally, the processor 610 is configured to:

report the interference information to the network side device during transition of the UE from the non-connected state to a connected state or when the UE is in the connected state.

Optionally, the processor 610 is configured to:

report the interference information to the network side device through a Msg3 or a Msg5 in a process of initiating RRC connection establishment or resuming RRC connection by the UE; or report the interference information to the network side device through a dedicated signaling of the connected state when the UE is in the connected state.

Optionally, the interference information includes at least one of:

interference indication information, affected measurement frequency domain, affected measurement area, affected measurement type, affected measurement time domain, affected RAT, or affected system type.

Optionally, the interference reporting configuration information includes at least one of:

information for instructing the UE whether to report interference; or interference reporting threshold information for instructing the UE to report the interference.

Optionally, the interference reporting threshold information includes an interference reporting threshold and/or an interference reporting offset threshold.

Optionally, the processor 610 is configured to:

report the interference information to the network side device if at least one of the following conditions is met:

a measurement result of the UE in the non-connected state is less than or equal to the interference reporting threshold; or an offset between the measurement result of the UE in the non-connected state and a measurement reporting threshold is greater than or equal to the interference reporting offset threshold.

Optionally, the interference reporting configuration information is sent through an RRC message carrying measurement configuration information; or the interference reporting configuration information and the measurement configuration information are sent through different RRC messages.

Optionally, the processor 610 is further configured to:

if the radio interference is detected during the measurement performed in the non-connected state, stop the measurement behavior in the non-connected state, suspend the measurement behavior in the non-connected state, or continue the measurement behavior in the non-connected state.

Optionally, the processor 610 is further configured to:

if the radio interference is detected during the measurement performed in the non-connected state and in a case where the measurement result in the non-connected state meets a preset condition, report a measurement result in the non-connected state to the network side device, or report to the network side device that there is an available measurement result.

The preset condition includes at least one of:

the measurement result in the non-connected state is greater than or equal to a measurement reporting threshold;

the measurement result in the non-connected state is greater than or equal to the interference reporting threshold; or an offset between the measurement result in the non-connected state and the measurement reporting threshold is less than or equal to the interference reporting offset threshold.

Optionally, the non-connected state includes an idle state or an inactive state.

In some embodiments of the present disclosure, if the UE detects the radio interference generated by IDC during measurements performed in the non-connected state, the UE may control the interference reporting behavior according to the interference reporting condition. As such, it may be possible to solve the IDC problem present in measurements performed in the non-connected state, and improve support for the technical solution of enhanced carrier rapid activation and deactivation. In this way, the network side device may be able to send configuration information for eliminating the radio interference according to the interference information reported by the UE, and the communication performance may be improved.

It will be understood that, in some embodiments of the present disclosure, the radio frequency unit 601 may be used for receiving and sending signals during a process of sending and receiving information or a call. For example, the radio frequency unit 601 may receive downlink data from a base station and then transmit the downlink data to the processor 610 to be processed, and send uplink data to the base station. Generally, the radio frequency unit 601 includes, but is not limited to, an antenna, at least one amplifier, a transceiver, a coupler, a low noise amplifier, a duplexer. In addition, the radio frequency unit 601 may also communicate with a network and other devices through a wireless communication system.

The UE provides wireless broadband Internet access for the user through the network module 602. For example, it helps the user send and receive emails, browse web pages and access streaming media.

The audio output unit 603 can convert audio data that is received by the radio frequency unit 601 or the network module 602 or that is stored in the memory 609 into audio signals and output the audio signals as sound. Moreover, the audio output unit 603 can further provide audio output (e.g., a call signal reception sound, a message reception sound, etc.) related to a specific function performed by the UE 600. The audio output unit 603 includes a speaker, a buzzer, a receiver, etc.

The input unit 604 is used for receiving audio or video signals. The input unit 604 may include a graphics processing unit (GPU) 6041 and a microphone 6042. The GPU 6041 processes image data of still pictures or videos obtained by an image capture device (e.g., a camera) in a video capture mode or an image capture mode. Processed image frames can be displayed on the display unit 606. The image frames processed by the GPU 6041 may be stored in the memory 609 (or other storage media) or sent via the radio frequency unit 601 or the network module 602. The microphone 6042 can receive sound, and can process such sound into audio data. The processed audio data can be converted into a format that can be sent to a mobile communication base station via the radio frequency unit 601 for output in a case of a telephone call mode.

The UE 600 further includes at least one type of sensor 605, such as a light sensor, a motion sensor and other sensors. The light sensor includes an ambient light sensor and a proximity sensor. The ambient light sensor can adjust a brightness of a display panel 6061 according to a brightness of the ambient light. The proximity sensor can turn off the display panel 6061 and/or backlight when the UE 600 is moved to an ear. As a type of motion sensor, an accelerometer sensor can detect a magnitude of acceleration in all directions (generally three axes), and can detect a magnitude and a direction of gravity when the accelerometer sensor is stationary. It can be used in identifying a posture of the UE (e.g., horizontal-vertical screen switching, related games, and magnetometer posture calibration), vibration recognition related functions (e.g., pedometer and tapping), etc. The sensors 605 may further include a fingerprint sensor, a pressure sensor, an iris sensor, a molecular sensor, a gyroscope, a barometer, a hygrometer, a thermometer and an infrared sensor, which will not be described in detail here.

The display unit 606 is used for displaying information input by the user or information provided to the user. The display unit 606 may include the display panel 6061, and the display panel 6061 may be configured in a form of a liquid crystal display (LCD), an organic light-emitting diode (OLED), or the like.

The user input unit 607 can be used to receive input digital or character information and generate key signal input related to user settings and function control of the UE. The user input unit 607 includes a touch panel 6071 and other input devices 6072. The touch panel 6071, also known as a touch screen, can collect the user's touch operations (e.g., the user's operations on or near the touch panel 6071 by using any suitable objects or accessories such as a finger and a touch pen) on or near the touch panel 6071. The touch panel 6071 includes two parts, i.e., a touch detection device and a touch controller. The touch detection device detects a user's touch position, detects a signal brought by the touch operation, and transmits the signal to the touch controller. The touch controller receives touch information from the touch detection device, converts the touch information into coordinates of a touch point, sends the coordinates of the touch point to the processor 610, and receives and executes a command from the processor 610. In addition, the touch panel 6071 may be implemented by using various types of touch panels such as a resistive touch panel, a capacitive touch panel, an infrared touch panel, or a surface acoustic wave touch panel. In addition to the touch panel 6071, the user input unit 607 may further include the other input devices 6072. The other input devices 6072 include, but are not limited to, a physical keyboard, function keys (e.g., volume control keys, switch keys, etc.), a trackball, a mouse and a joystick, which will not be described in detail here.

Further, the touch panel 6071 may be overlaid on the display panel 6061. After the touch panel 6071 detects a touch operation on or near it, the touch panel 6071 transmits the touch operation to the processor 610 to determine a type of the touch event, and then the processor 610 provides a corresponding visual output on the display panel 5061 according to the type of the touch event. Although in FIG. 8, the touch panel 6071 and the display panel 6061 are used as two separate components to implement input and output functions of the UE, in some embodiments, the touch panel 6071 and the display panel 6061 can be integrated to implement the input and output functions of the UE, which is not specifically limited here.

The interface unit 608 is an interface for connecting an external device and the UE 600. For example, the external device includes a wired or wireless headset port, an external power supply (or battery charger) port, a wired or wireless data port, a memory card port, a port for connecting a device with an identification module, an audio input/output (I/O) port, a video I/O port, and an earphone port. The interface unit 608 may be used for receiving input (e.g., data information or power) from the external device and transmit the received input to one or more elements in the UE 600, or may be used for transmitting data between the UE 600 and the external device.

The memory 609 may be used for storing software programs and various types of data. The memory 609 may mainly include a program storage area and a data storage area. The program storage area can store an operating system and an application program required by at least one function (e.g., a sound playing function and an image playing function). The data storage area can store data (e.g., audio data and a phone book) created according to use of a mobile phone. In addition, the memory 609 may include a high-speed random access memory, and may further include a non-volatile memory, such as at least one magnetic disk storage device, a flash memory device, or other non-volatile solid-state storage devices.

The processor 610 is a control center of the UE. The processor 610 connects all parts of the entire UE through various interfaces and wirings, and executes various functions of the UE and processes data by running or executing software programs and/or modules stored in the memory 609 and calling data stored in the memory 609, so as to realize overall monitoring of the UE. The processor 610 may include one or more processing units. Optionally, an application processor and a modem processor may be integrated into the processor 610. The application processor mainly deals with operating systems, user interfaces and application programs, and the modem processor mainly deals with wireless communication. It will be understood that the modem processor may not be integrated into the processor 610.

The UE 600 may further include the power supply 611 (e.g., a battery) for supplying power to all components. Optionally, the power supply 611 may be logically connected to the processor 610 through a power management system, so as to realize charging management, discharging management, power consumption management, and other functions are through the power management system.

In addition, the UE 600 includes some functional modules that are not shown, which will not be described in details here.

Optionally, some embodiments of the present disclosure further provide a UE, which includes a processor 610, a memory 609, and a computer program that is stored in the memory 609 and executable on the processor 610. The computer program, when executed by the processor 610, implements all processes of the embodiments of the method for controlling interference reporting described above, and may achieve the same technical effects. In order to avoid repetition, details will not be repeated here.

Figure 9:
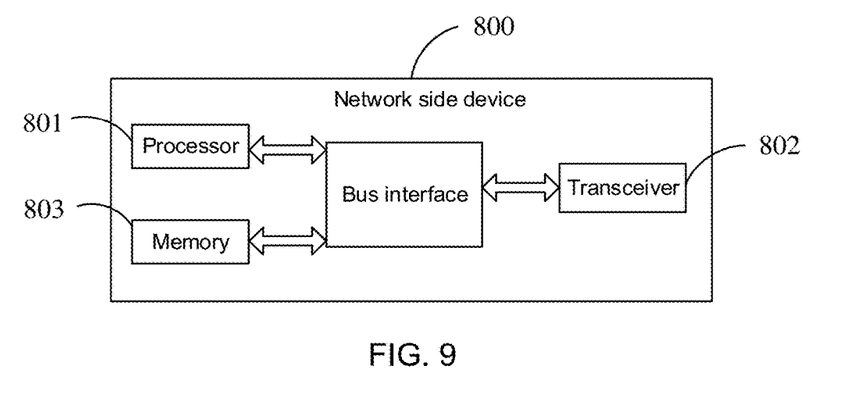
FIG. 9 is a schematic diagram showing a hardware structure of a network side device, in accordance with some embodiments of the present disclosure.

FIG. 9 is a schematic diagram showing a hardware structure of another network side device according to some embodiments of the present disclosure. As shown in FIG. 9, the network side device 800 includes a processor 801, a transceiver 802, a memory 803 and a bus interface.

The transceiver 802 is configured to send interference reporting configuration information to a UE so that the UE controls an interference reporting behavior according to the interference reporting configuration information in a case where the UE detects radio interference during a measurement performed in the non-connected state.

The radio interference includes interference generated by IDC.

Optionally, the interference reporting configuration information includes at least one of:

information for instructing the UE whether to report interference; or interference reporting threshold information for instructing the UE to report the interference.

Optionally, the interference reporting threshold information includes an interference reporting threshold and/or an interference reporting offset threshold.

Optionally, the interference reporting configuration information is sent through an RRC message carrying measurement configuration information; or the interference reporting configuration information and the measurement configuration information are sent through different RRC messages.

In FIG. 9, a bus architecture may include any number of interconnected buses and bridges, linking one or more processors represented by the processor 801 and various circuits represented by the memory 803 together. The bus architecture may also link various other circuits such as peripherals, voltage regulators, power management circuits together which are well known in the art and will not be described any further here. The bus interface provides interfaces. The transceiver 802 may be a plurality of elements. That is, it includes a transmitter and a receiver, and provides a unit for communicating with various other apparatus on a transmission medium. For different user devices, the bus interface may also be an interface capable of being externally and internally connected to a desired device, which includes but is not limited to a keypad, a display, a speaker, a microphone, a joystick, etc.

The processor 801 is responsible for bus architecture management and general processing, and the memory 803 can store data used by the processor 801 in performing operations.

It will be noted that, the network side device 800 in the present embodiment may be a network side device in any implementation manner in the method embodiments of the embodiments of the present disclosure. Any implementation manner of the network side device in the method embodiments may be implemented by the network side device 800 in the present embodiment, and the same beneficial effects may be achieved. In order to avoid repetition, details will not be repeated here.

Some embodiments of the present disclosure further provide a non-transitory computer-readable storage medium. The non-transitory computer-readable storage medium has stored thereon a computer program that, when executed by a processor, implements all processes of the method for controlling interference reporting corresponding to a network side device or a UE, which may achieve the same technical effects. In order to avoid repetition, details will not be repeated here. The non-transitory computer-readable storage medium may be, for example, a read-only memory (ROM), a random access memory (RAM), a magnetic disk, an optical disk, etc.

It will be noted that, the terms such as "include", "comprise" or any other variants thereof herein are intended to indicate a non-exclusive inclusion. For example, a process, a method, an article or a device that includes a series of elements not only includes those elements, but also includes other elements that are not explicitly listed, or includes elements inherent to the process, the method, the article or the device. In a case where there are no more limitations, an element defined by the phrase "including/comprising a . . . " does not exclude existence of other identical elements in a process, a method, an article or a device that includes the element.

Through the description of the above embodiments, a person skilled in the art will clearly understand that, the method in the above embodiments can be implemented by software plus a necessary general-purpose hardware platform, and of course, can also be implemented by hardware. However, in many cases, the former is a better implementation. On a basis of such understanding, an essence or a part that contributes to the related art of the technical solution of the present disclosure may be embodied in a form of a software product. The computer software product is stored in a storage medium (e.g., a ROM/RAM, a diskette or an optical disk), and includes several instructions for causing a UE (which may be a mobile phone, a computer, a server, an air conditioner or a network device) to perform the methods described in all embodiments of the present disclosure.

The foregoing descriptions are merely specific implementation manners of the present disclosure, but the protection scope of the present disclosure is not limited thereto. Any person skilled in the art could readily conceive of changes or replacements within the technical scope of the present disclosure, which shall be included in the protection scope of the present disclosure. Therefore, the protection scope of the present disclosure shall be subject to the protection scope of the claims.

What is claimed is:

1. A method for controlling interference reporting in enhanced utilization of carrier aggregation (EuCA) scenario, performed by a user equipment, the method comprising:
controlling an interference reporting behavior according to an interference reporting condition in response to radio interference being detected during a measurement performed in a non-connected state,
wherein the radio interference includes interference generated by in-device coexistence (IDC);
the method further comprising:
in response to the radio interference being detected during the measurement performed in the non-connected state, stopping a measurement behavior in the non-connected state, or suspending the measurement behavior in the non-connected state.

2. The method according to claim 1, wherein the interference reporting condition is pre-agreed by a protocol; or
the interference reporting condition is obtained through interference reporting configuration information sent by a network side device; or
the interference reporting condition is negotiated and agreed between the user equipment and the network side device.

3. The method according to claim 2, wherein in response to the interference reporting condition being pre-agreed by the protocol, the interference reporting condition includes:
always reporting interference information to the network side device; or
reporting the interference information to the network side device in response to the user equipment having an interference detection assistance capability.

4. The method according to claim 2, wherein the interference reporting configuration information includes at least one of:
information for instructing the user equipment whether to report interference; or
interference reporting threshold information for instructing the user equipment to report the interference.

5. The method according to claim 4, wherein the interference reporting threshold information includes an interference reporting threshold and/or an interference reporting offset threshold.

6. The method according to claim 5, wherein controlling the interference reporting behavior according to the interference reporting condition includes:
reporting interference information to a network side device in response to at least one of following conditions being met:
a measurement result of the user equipment in the non-connected state is less than or equal to the interference reporting threshold; or
an offset between the measurement result of the user equipment in the non-connected state and a measurement reporting threshold is greater than or equal to the interference reporting offset threshold.

7. The method according to claim 5, further comprising:
in response to the radio interference being detected during the measurement performed in the non-connected state and in response to a measurement result in the non-connected state meeting a preset condition, reporting the measurement result in the non-connected state to a network side device, or reporting to the network side device that there is an available measurement result,
wherein the preset condition includes at least one of:
the measurement result in the non-connected state is greater than or equal to a measurement reporting threshold;
the measurement result in the non-connected state is greater than or equal to the interference reporting threshold; or
an offset between the measurement result in the non-connected state and the measurement reporting threshold is less than or equal to the interference reporting offset threshold.

8. The method according to claim 2, wherein the interference reporting configuration information is sent through a radio resource control (RRC) message carrying measurement configuration information; or
the interference reporting configuration information and the measurement configuration information are sent through different RRC messages.

9. The method according to claim 1, wherein controlling the interference reporting behavior according to the interference reporting condition includes:
reporting interference information to a network side device during transition of the user equipment from the non-connected state to a connected state or in response to the user equipment being in the connected state.

10. The method according to claim 9, wherein reporting the interference information to the network side device during transition of the user equipment from the non-connected state to the connected state or in response to the user equipment being in the connected state includes:
reporting the interference information to the network side device through a third message (Msg3) or a fifth message (Msg5) in a process of initiating radio resource control (RRC) connection establishment or resuming RRC connection by the user equipment; or
reporting the interference information to the network side device through a dedicated signaling of the connected state in response to the user equipment being in the connected state.

11. The method according to claim 10, wherein the interference information includes at least one of:
interference indication information, affected measurement frequency domain, affected measurement area, affected measurement type, affected measurement time domain, affected radio access technology (RAT), or affected system type.

12. The method according to claim 1, further comprising:
in response to the radio interference being detected during the measurement performed in the non-connected state, continuing the measurement behavior in the non-connected state.

13. The method according to claim 1, wherein the non-connected state includes an idle state or an inactive state.

14. A user equipment, comprising:
a processor, configured to, in enhanced utilization of carrier aggregation (EuCA) scenario, control an interference reporting behavior according to an interference reporting condition in response to radio interference being detected during a measurement performed in a non-connected state,
wherein the radio interference includes interference generated by in-device coexistence (IDC); wherein
the processor is further configured to:
in response to the radio interference being detected during the measurement performed in the non-connected state, stop a measurement behavior in the non-connected state, or suspend the measurement behavior in the non-connected state.

15. The user equipment according to claim 14, wherein the processor is further configured to:
in response to the radio interference being detected during the measurement performed in the non-connected state, continue the measurement behavior in the non-connected state.

16. A non-transitory computer-readable storage medium, wherein the non-transitory computer-readable storage medium has stored thereon a computer program that, when executed by a processor, implements steps in the method for controlling interference reporting in enhanced utilization of carrier aggregation (EuCA) scenario according to claim 1.

17. A non-transitory computer-readable storage medium, wherein the non-transitory computer-readable storage medium has stored thereon a computer program that, when executed by a processor, implements steps in the method for controlling interference reporting in the enhanced utilization of carrier aggregation (EuCA) scenario according to claim 2.

* * * * *